United States Patent [19]

McDermott et al.

[11] Patent Number: 4,558,451

[45] Date of Patent: Dec. 10, 1985

[54] TUBULAR SINGLET DELTA OXYGEN GENERATOR

[75] Inventors: William E. McDermott, Albuquerque; David E. Ellis, Kirtland AFB; Nicholas R. Pchelkin, Los Lunas; George W. Miller, Rio Rancho, all of N. Mex.; David J. Benard, Newbury Park; Ralph J. Richardson, San Ramon, both of Calif.

[73] Assignee: The United States of America as represented by the Secretary of the Air Force, Washington, D.C.

[21] Appl. No.: 399,567

[22] Filed: Jul. 19, 1982

[51] Int. Cl.$^4$ ............ H01S 3/095; C01B 13/00
[52] U.S. Cl. .................... 372/89; 422/120; 423/579
[58] Field of Search .......... 422/120, 231, 129, 189; 423/579; 372/89; 261/78 A, 112

[56] References Cited

U.S. PATENT DOCUMENTS

| | | | |
|---|---|---|---|
| 3,593,968 | 7/1971 | Geddes | 261/112 X |
| 3,929,977 | 12/1975 | Brennan | 423/520 |
| 3,980,762 | 9/1976 | Shiblom, Jr. et al. | 423/579 |
| 4,102,950 | 7/1978 | Pilipovich et al. | 423/579 |
| 4,117,714 | 10/1978 | Goodson et al. | 422/88 X |
| 4,246,252 | 1/1981 | McDermott et al. | 423/579 |
| 4,267,526 | 5/1981 | McDermott et al. | 372/89 |
| 4,310,502 | 1/1982 | Wagner | 422/120 X |
| 4,342,116 | 7/1982 | MacKnight et al. | 422/120 X |
| 4,375,185 | 3/1983 | Mencacci | 261/112 X |

OTHER PUBLICATIONS

R. J. Richardson et al., J. Appl. Phys. 52 (8), Aug. 1981.
D. J. Benard et al., Appl. Phys. Lett. 34 (1), Jan. 1, 1979.

*Primary Examiner*—Barry S. Richman
*Assistant Examiner*—Brion P. Heaney
*Attorney, Agent, or Firm*—Donald J. Singer; William J. O'Brien

[57] ABSTRACT

A generating device for producing a laser energizing gas in the singlet delta, electronic state comprising a vacuum chamber; a tubular reaction chamber positioned within said vacuum chamber, said reaction chamber having a closed end and an oppositely disposed open end; means positioned in said closed end for introducing a flow of a gaseous reactant into said reaction chamber; means positioned adjacent said closed end at an angle perpendicular to the position of said gas introducing means for introducing a stream of a liquid reactant into said gas flow to effect a chemical reaction therebetween and the generation of a laser energizing, singlet delta gas; and means for interconnection to a lasing device for directing a flow of said generated, singlet delta gas to a lasing cavity.

3 Claims, 2 Drawing Figures

TUBULAR SINGLET DELTA OXYGEN GENERATOR

STATEMENT OF GOVERNMENT INTEREST

The invention described herein may be manufactured and used by or for the United States Government for governmental purposes without the payment of any royalty thereon.

BACKGROUND OF THE INVENTION

This invention relates to high energy chemical lasers and to a system for generating singlet delta, energizing, molecular gas for use with such lasers. More particularly, this invention concerns itself with an apparatus for generating molecular oxygen in the excited singlet-delta electronic state.

The increased use of high energy lasers that generate a lasing action through the medium of a chemical reaction has created a need for generating systems capable of producing energizing gaseous reactants as economically and efficiently as possible. One reactant component which finds wide acceptance in chemical lasing systems is molecualar oxygen in the singlet delta electronic state. This excited molecule of oxygen has 1.0 ev of energy above the ground state and, as a consequence, can be added to a suitable optically active media. The mixture is then passed through an optical resonator to bring about a lasing action.

A number of methods and devices have been developed heretofore for the generation of singlet delta, molecular oxygen. Microwave discharge in oxygen has been relied on as well as various chemical schemes. One chemical scheme utilizes a mixture of hydrogen peroxide, sodium hydroxide and calcium hypochlorate. Another reacts hydrogen peroxide with a hypohalite, such as chlorine fluorosulfate. Still another chemical scheme effects a reaction between chlorine gas and a liquid mixture of hydrogen peroxide and sodium hydroxide.

The generating systems relied on heretofore have proven successful in generating excited molecular oxygen for use in high energy lasers. However, with the increased interest in the use of these lasers for a variety of military and communication applications, it became obvious that critical need existed for systems or devices that could generate excited molecular oxygen in a manner that was as simple, efficient and economical as possible.

In a continuing research effort aimed at solving this problem and providing an economical, efficient and reliable source of excited molecular oxygen, it was found that the use of an elongated, tubular reaction chamber having a circular, interior wall wetted by a liquid reactive component, could be employed to generate electronically excited molecular oxygen in the singlet delta state. The excited oxygen can then be used, for example, as the energizing gas reactant in a conventional, continuous wave, chemically pumped atomic iodine laser.

SUMMARY OF THE INVENTION

In accordance with this invention, it has been found that molecular oxygen in the electronically excited singlet delta state can be generated in an efficient and reliable manner by a generating device which comprises a tubular reaction chamber having a substantially circular cross-section which in turn is positioned within a vacuum chamber. The generating device is then interconnected to a conventional atomic iodine laser for providing the laser with electronically excited oxygen as one of the reacting components. The laser itself provides the necessary vacuum source to evacuate the vacuum chamber of the generating device during its operation.

A source of chlorine gas is introduced into the center of one end of the reaction chamber along with a liquid mixture of hydrogen peroxide and sodium hydroxide. Suitable control devices control the flow rates of the gas and liquid. This results in a gas/liquid flow in the reaction chamber that provides a gas/liquid interface of circular cross-section with liquid being drawn as a thin film along the interior surface of the wall of the reactive chamber with the gas occupying the interior volume of the reaction chamber. The chlorine gas reacts with the liquid component at the gas/liquid interface to form the desired singlet delta oxygen which then flows out of the open end of the reaction chamber into the vacuum chamber and then, in turn, to a conventional lasing device. The conventional method of generating singlet oxygen by chemically reacting chlorine gas, hydrogen peroxide and sodium hydroxide is disclosed in greater detail in U.S. Pat. No. 4,246,252, issued Jan. 20, 1981 to McDermott et al.

The apparatus of this invention provides an economical, simple and efficient means for generating adequate amounts of singlet delta oxygen molecules for use as an energizing gas in order to effect a continuous wave, chemically pumped lasing action. The length of the generating chamber can be varied to maximize chlorine absorption and minimize deactivation of the excited oxygen. The device operates at low pressures and in any position relative to the direction of gravity. Preferably it operates best if positioned vertically with respect to the flow of chlorine.

Operation of the device has been undertaken several times and over 55 percent of singlet delta oxygen was observed on an electron paramagnetic resonance spectrometer. The actual generator yield, however, is considerably higher than this measured amount because some deactivation occurs in the vacuum chamber surrounding the reaction tube before the excited oxygen reaches the spectrometer. In these experimental operations, the tubular reaction chamber had a length of 19.5 cm and an inside diameter of 0.9 cm. The chlorine flow rate was 5 standard liters per minute and the liquid mixture flow rate was about 0.5 liters per minute. The novelty of the generating device of this invention appears to reside in providing both a gas and liquid flow through the device and the use of a circular wall wetted by the liquid reactant to generate excited gas molecules.

Accordingly, the primary object of this invention is to provide a device for generating adequate amounts of an electronically excited gas for use as an energizing medium in a chemical laser.

Another object of this invention is to provide a device for generating molecular oxygen in the excited, singlet delta, electronic state.

Still another object of this invention is to provide a simple and dependable device for producing electronically excited molecular oxygen in an efficient and economical manner for use as the energizing gas in a continuous wave, chemically pumped laser.

The above and still other objects and advantages of the present invention will become more readily apparent upon consideration of the following detailed description thereof when taken in conjunction with the accompanying drawings.

DESCRIPTION OF THE PREFERRED EMBODIMENT

Figure 1:
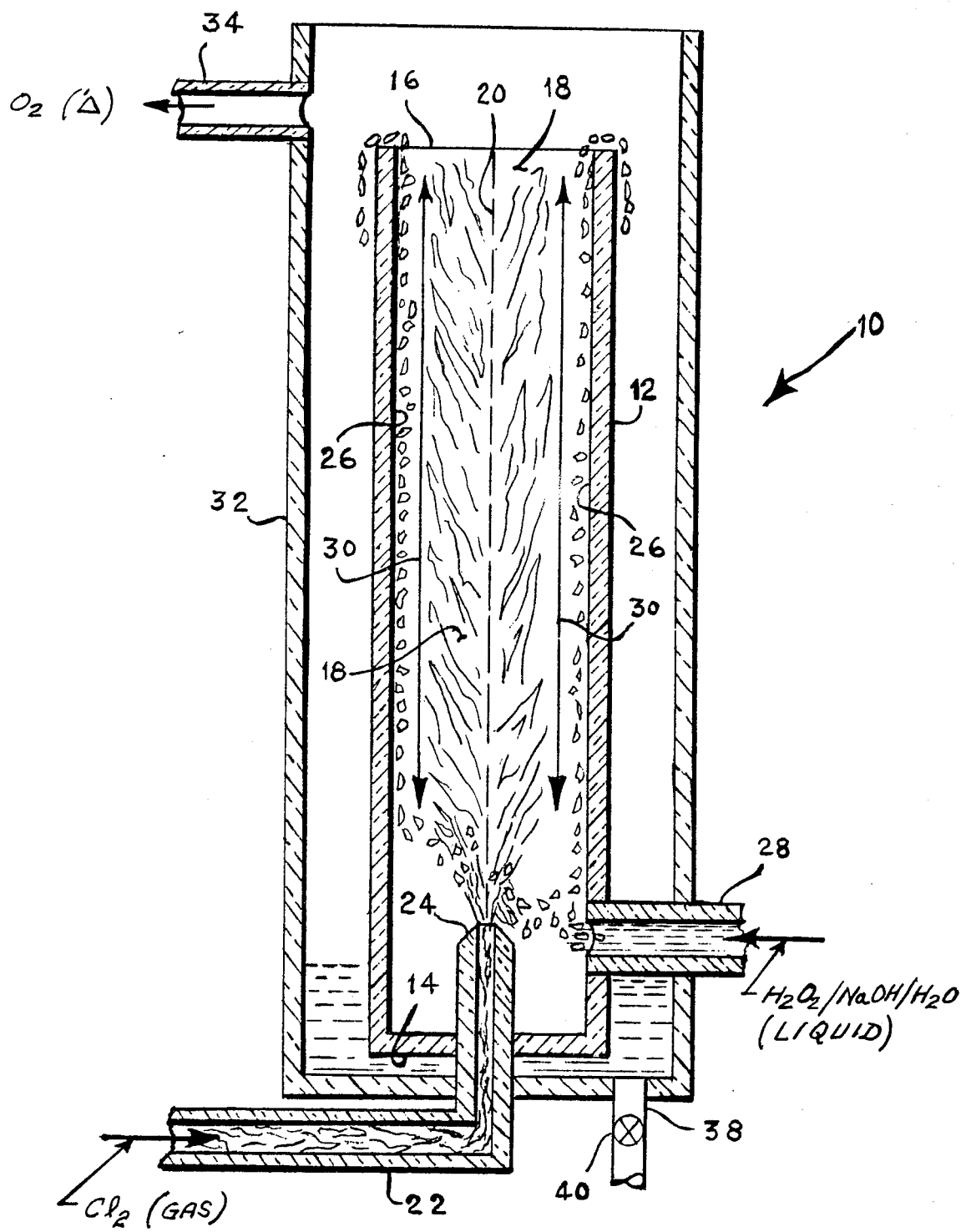
FIG. 1 is a schematic illustration of the singlet delta oxygen generating device of this invention.

Pursuant to the above defined objects, the present invention concerns itself, in particular, with a simple and dependable device for the efficient and economical generation of reasonably large amounts of electronically excited molecular oxygen. Excited molecular oxygen is usually identified by the symbol $O_2(^1\Delta)$.

Gaseous molecules, such as oxygen, are capable of existing in different energy states. It is considered to be in an excited state when its energy state is higher than its usual ground state. One of the excited states for oxygen is the singlet delta molecular state in which the oxygen molecule posseses 1.0 ev of energy above its ground state. Consequently, singlet delta molecular oxygen can serve as an energizing gas and a source of pumping energy in a high energy chemical laser. The chemical generation of $O_2(^1\Delta)$ has been accomplished heretofore by resorting to a variety of methods and devices. However, the methods and devices relied on were not capable of producing this energizing gas in an efficient and economical manner and in amounts adequate to satisfy the needs of continuous wave, chemically pumped, high energy lasers.

With the present invention, however, the problem of providing an economical, efficient, dependable and simple system for generating singlet delta oxygen has been overcome by a novel generating device that utilizes the conventional chemical reaction which occurs between gaseous chlorine and a basic hydrogen peroxide solution. The novelty of the generating device of this invention resides in directing a stream of the chlorine gas through the central portion of an elongated, tubular reaction chamber having a substantially circular cross-section while simultaneously directing a stream of a basic hydrogen peroxide solution along the interior surfaces of the walls of the tubular reaction chamber, thus creating a gaseous/liquid interface within the reaction tube.

The reaction tube is fabricated from glass, or some other convenient inert material, and is fed by a liquid supply near the bottom of the tube. A chlorine gas nozzle is positioned in the bottom of the tube. The tube is open at the top to let excess liquid and singlet delta molecular oxygen escape from the generator into a vacuum chamber which surrounds the generator tube. The liquid basic hydrogen peroxide is sucked from a conventional pressurized storage tank into the bottom of the generator tube by the differential pressure of the evacuated generator and the pressurized storage tank. $Cl_2$ gas is allowed to enter the generator and forms a jet of gas which is contained by the walls of the tube. This allows a pressure drop as the gas accelerates up the tube at constant mass flow. When the liquid depth rises to the level of the chlorine gas nozzle, the liquid begins to wet the inner wall of the glass tube. A continuous thin film of liquid is aspirated along the walls as long as the gas and liquid are flowing, forming a gas-liquid interface. This allows for a known area of the liquid to react with the flowing gas for a fixed period of time. The reactive area is determined by the diameter and length of the glass tube. The time of reaction is determined by mass flow of the chlorine and the generator pressure. The mass flows of the generator are produced by the flow of the chlorine gas. The reaction can produce up to one molecule of singlet delta oxygen for each chlorine molecule added. The amount of liquid in the thin film must provide sufficient reactant to reach a stoichiometric balance. The liquid flow, however, is an order of magnitude greater than stoichiometry in most cases with no loss in performance of the generator. This is easily calculated based on the area of the tube and the flow rate of the liquid. In one test, the particular tube was run with up to 0.001 moles/sec of chlorine and from 0.005 moles/sec to 0.020 moles/sec of liquid.

A detailed illustration of the $O_2(^1\Delta)$ generating device of this invention is illustrated schematically in FIG. 1 of the drawings. In FIG. 1, the generating device 10 comprises an elongated tubular reaction chamber 12 having a closed end 14 and an open end 16 with an interior portion 18 of substantially circular cross-section along its longitudinal axis as indicated by dash line 20. Conduit means 22 is centrally positioned within the closed end 14 and extends into the chamber 12. A stream of chlorine gas, from a convenient source not shown, is directed through the conduit 22 and nozzle 24 into the interior portion 18 of the chamber 12. The chlorine gas forms a jet stream which is contained by the walls 26 of the chamber 12, and flows parallel to the longitudinal axis 20. Conduit means 28 is positioned in the bottom portion of the side wall 26 perpendicular and adjacent to nozzle 24 and directs a stream of a basic hydrogen peroxide liquid solution from a pressurized liquid storage tank, not shown, into the bottom of interior portion 18 of chamber 12. The liquid from conduit 28 is composed of hydrogen peroxide mixed with an appropriate amount of a basic substance such as sodium hydroxide. Suitable control valves, not shown, in conduits 22 and 28 control the flow of the chlorine gas and hydrogen peroxide liquid mixture. The liquid hydrogen peroxide, as it enters chamber 12, is sucked from its storage tank through conduit 28 by the differential pressure that exists between the evacuated generator tube 12 and the atmospheric or pressurized liquid storage tank. As the chlorine gas enters the bottom portion 14 of tube 12, it forms a jet of gas which is contained by the walls 26 of the tube 12. This allows a pressure drop as the gas accelerates up the tube 12 at constant mass flow. When the liquid depth rises to the level of the chlorine gas nozzle 24, the liquid begins to wet the inner walls 26 of the glass tube 12. A continuous thin film of the liquid is aspirated along the walls 26 as long as the gas and liquid are flowing, thus forming a gas/liquid interface as indicated by double arrow lines 30. This provides for a known area of liquid to react with the flowing gas for a fixed period of time which depends upon the diameter and length of the tube 12. The time of the reaction is determined by the mass flow of the chlorine gas and the pressure existing in tube 12. The mass flows of the generator 12 are produced by the flow of chloride gas introduced through conduit 22 and nozzle means 24. The reaction, which is more specifically described by McDermott in U.S. Pat. No. 4,246,252, can produce up to one molecule of singlet oxygen for each chlorine molecule added to the reaction tube 12. The amount of liquid in the thin film of liquid flowing along the inside walls 26 must provide sufficient reactants to achieve a stoichiometric balance. However, in most situations, the liquid flow is an order of magnitude greater than stoichiometry with no loss in performance of the generator. The amount required is easily calculated based on the interior area of the tube and the flow rate of the liquid.

Figure 2:
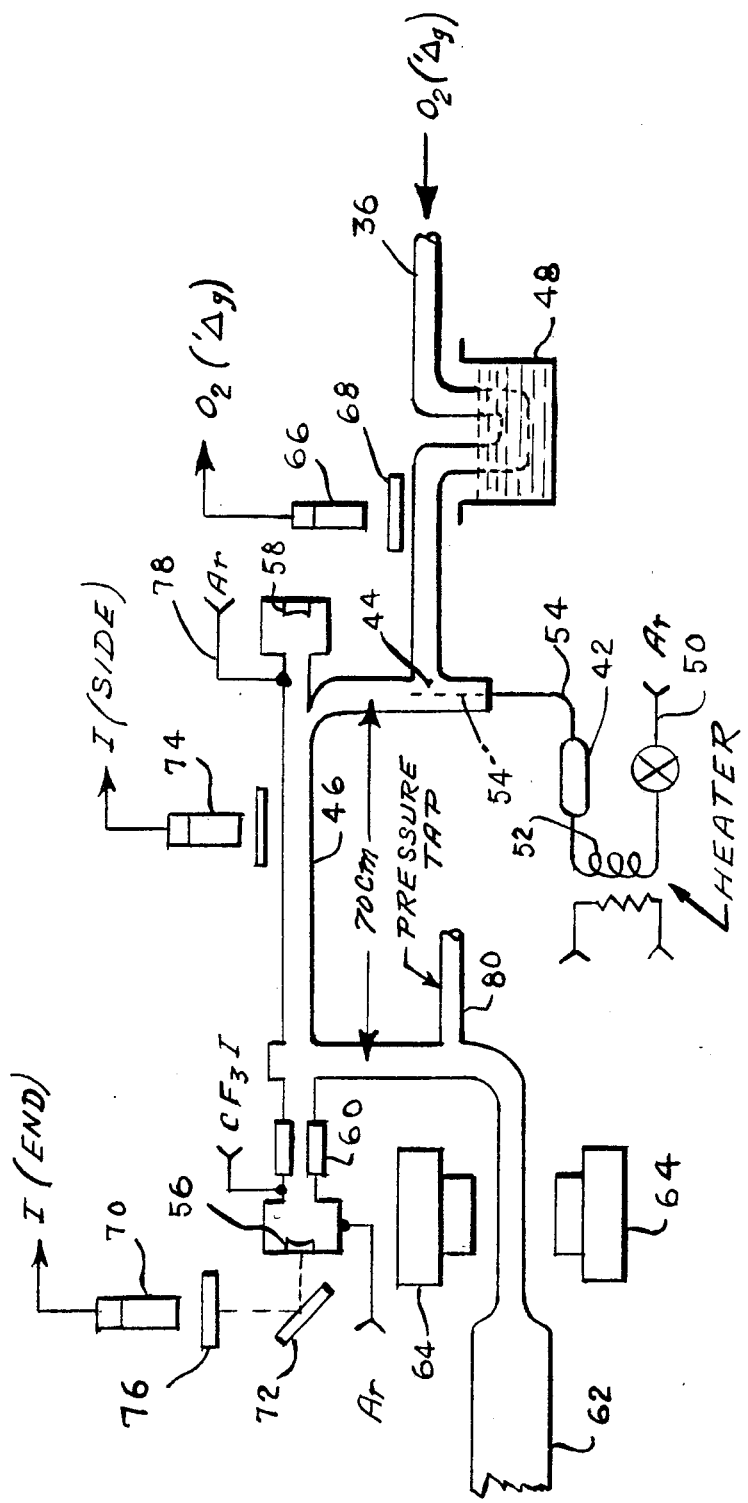
FIG. 2 is a schematic illustration showing a conventional, chemically pumped atomic iodine laser suitable for use with the electronically excited oxygen generator disclosed in FIG. 1.

The reaction tube 12 is positioned within a vacuum chamber 32 which, in turn, is interconnected by means of conduit 34 to a conduit 36 of a conventional lasing device as shown in FIG. 2. The single delta oxygen reaction product generated in the generating tube 12 flows out through end 16 into vacuum chamber 32 and then through conduit 34 to the laser of FIG. 2. Suitable valve means, not shown, can be interposed between conduits 34 and 36 to control the flow of $O_2(^1\Delta)$. Any unreacted liquid in tube 12 flows over the upper lip of walls 26 and falls to the bottom of vacuum chamber 32. A convenient evacuation tube 38 and valve means 40 can be utilized to remove any unreacted liquid reactant. Any excess unreacted chlorine gas is drawn through conduits 34 and 36 into the lasing system of FIG. 2 where it is harmlessly discipated.

The lasing device of FIG. 2 which illustrats the type of laser that can utilize the $O_2(^1\Delta)$ energizing gas generated by this device of the invention, is operated in the following manner. Molecular iodine from container 42 is injected at 44 into a flow of excited molecular oxygen at a point just ahead of its entrance into laser cavity 46. As the $O_2(^1\Delta)$ enters into the lasing device from conduit 36, it passes through a −160° C. cold trap 48, Argon gas 50 passes through a heater 52 to heat the gas to a temperature of about 90° C. The heated argon 50 then passes through a stainless steel bomb 42 filled with molecular iodine where the $I_2$ is entrained by the argon gas 50 which then flows into the laser cavity 46 through a moveable stainless steel injector tube 54. The tube 54 is capped and has four small holes drilled around its periphery. When $I_2$ is injected into the oxygen stream at 44, a bright yellow flame due to $I_2$(B-X) radiation is observed. The $I_2$ flame dies off within a few cm of the point of injection 44. The active portion of the $O_2$-$I^*$ flow is contained inside a 70 cm long 1" ID pyrex tube coated with a halocarbon wax, where the linear flow velocity is approximately 1500 cm/sec.

The laser cavity 46 is 1.7 m long with the internal maximum reflectance dielectric mirrors 56 and 58 of 5 m and 2 m radius of curvature respectively. A small (10 cm long) flashlamp 60 is integral to the cavity 46 to allow optical alignment by photodissociation of $CF_3I$. The cavity threshold was found to occur near 20 millitorr $CF_3I$ with a flash energy of 60 joules, corresponding to a single pass threshold gain of 0.2%. The mirror transmission was measured to be less than $10^{-2}$%. Optical alignment is difficult to achieve before operating, but the addition of $CF_3I$ to the flashlamp 60, as shown, facilitates alignment of the mirrors.

The exhaust from the laser cavity 46 exits through vacuum means 62 and is analyzed by a Varian Model E-112 electronic paramagnetic resonance spectrophotometer 64 that was used to calibrate the optical diagnostics for the $O_2(^1\Delta)$ and to measure the purity of the chemically generated oxygen by detecting both the $O_2(^1\Delta)$ and $O_2(^3\Sigma)$ resonances. The chemical generator performance for producing the $O_2(^1\Delta)$ was monitored at the exit of the cold trap 48 with a liquid nitrogen cooled intrinsic Ge detector 66 at 1270 nm using a 10 nm band pass interference filter 68.

The I($^2$p-$^2$p3/2) emission in the laser cavity was similarly monitored by a second cooled intrinsic Ge detector 70 looking down the laser axis through angled mirror 72 and an InAs detector 74 (liquid nitrogen cooled with phase sensitive detection) viewing the side emission approximately 10 cm down from the inlet to cavity 46. The sensitivity of the two $I^*$ detectors 70 and 74 were limited to 1315 nm by 10 nm band pass interference filters 68 and 76. The output from the on-axis detector 70 was displayed vertically by an X-Y recorder and the side-looking detector 74 horizontally by an X-Y recorder not shown.

Argon gas 78 was injected into cavity 46 to keep the flowing mixture of $O_2(^1\Delta)$ and $I_2$ off mirrors 58 and 56 since $I_2$ has a tendency to damage it. A pressure tap 80 measures the pressure in the laser cavity 46.

Below laser threshold, the on-axis detector 70 tracked linearly with the side locking detector 74 as the $I_2$ flow was increased. Near threshold, the curve began to show an upward curvature approaching the vertical as the system approached threshold.

In a typical laser experiment, a flow of about 1 torr of total oxygen was used, the mirrors were purged with 0.6 torr of Argon gas 78 and a similar flow of Argon gas 50 was passed through the $I_2$ injection tube 54. The iodine flow was then adjusted until the plot of longitudinal versus side fluorescence began to show an upward curvature. At this point, the laser mirrors 56 and 58 were tuned slightly to maximize the end fluorescence. Typically, laser action was evidenced by either a greater than 200-fold increase in the end fluorescence with no change in the side fluorescence or by saturation of the intrinsic Ge detector 70. The mode pattern of the laser could be readily observed on a Kodak IR phosphor card, not shown, placed approximately three meters from the output mirror 56. Mode switching occurred when the mirrors were slightly adjusted. Run time of several minutes were obtained and lasing could be terminated by (1) adjusting the cavity off resonance, (2) turning off the $I_2$ flow, or (3) turning off the $O_2(^1\Delta)$ flow or, if desired, by turning off the chlorine flow in the oxygen generator.

While the invention has been described with reference to a particular embodiment, it should be understood by those skilled in the art that various alterations and modifications can be accomplished, and that all such modifications as are encompassed within the appended claims are intended to be included herein.

What is claimed is:

1. An apparatus for generating a molecular oxygen gas in the electronically excited singlet delta state consisting essentially of:
   (A) a housing and means connecting thereto for creating a vacuum therein;
   (B) an elongated tubular reaction chamber positioned within said housing, said reaction chamber having sidewalls running parallel to the longitudinal axis of said reaction chamber and which define a substantially circular cross-sectional interior portion, and said reaction chamber further having a closed end and an oppositely disposed open end;
   (C) means for introducing and directing a flow of a gaseous reactant into said reaction chamber, said means for introducing said gaseous reactant being positioned within the closed end of said reaction chamber wherein said gaseous reactant flows substantially parallel to the longitudinal axis of said reaction chamber and assumes a substantially circular cross-sectional area as defined by said sidewalls;

(D) means for introducing and directing a stream of an aspirated liquid reactant into said reaction chamber adjacent to the flow of said gaseous reactant, said means for introducing a liquid reactant being positioned within the sidewalls of said elongated chamber at an angle perpendicular to the longitudinal axis of said reaction chamber thus providing a gas/liquid interface of circular cross-section along the interior surface of said sidewalls of said chamber to affect a reaction between said gaseous and liquid reactants to generate a singlet delta, electronically excited, molecular oxygen gas; and (E) said means for creating a vacuum being in fluid communication with said housing at a point adjacent said open end of said reaction chamber thereby directing a flow of said molecular oxygen from said reaction chamber through said housing for subsequent use.

2. An apparatus in accordance with claim 1 wherein said reaction chamber is vertically positioned within said housing.

3. A laser system comprising:

(A) a laser, said laser having a lasing cavity and means for creating a vacuum; and (B) a singlet delta molecular gas generator interconnected to said laser and comprising;

(1) a vacuum chamber;

(2) an elongated tubular reaction chamber positioned within said vacuum chamber, said reaction chamber having sidewalls running parallel to the longitudinal axis of said reaction chamber and which define a substantially circular cross-sectional interior portion, said reaction chamber further having a closed end and an oppositely disposed open end;

(3) means for introducing and directing a flow of a gaseous reactant into said reaction chamber, said means for introducing said gaseous reactant being positioned within the closed end of said reaction chamber wherein said gaseous reactant flows substantially parallel to the longitudinal axis of said reaction chamber and assumes a substantially circular cross-sectional area as defined by said walls;

(4) means for introducing and directing an aspirated stream of a liquid reactant into said reaction chamber adjacent to the flow of said gaseous reactant, said means for introducing a liquid reactant being positioned within the sidewalls of said reaction chamber at an angle prependicular to the longitudinal axis of said reaction chamber thus providing a gas/liquid interface of circular cross-section along the interior surface of said sidewalls of said elongated reaction chamber to affect reaction between said gaseous and liquid reactants and thereby generate a singlet delta, electronically excited, molecular oxygen gas; and (5) means interconnected between said vacuum chamber and said lasing cavity for drawing and directing a flow of said generated electronically excited molecular oxygen gas from said generator to said cavity for subsequent reaction with a lasing medium.

* * * * *